United States Patent [19]
Reuben et al.

[11] Patent Number: 5,467,385
[45] Date of Patent: Nov. 14, 1995

[54] CALLING NUMBER DISPLAY AND RECORDING SYSTEM

[76] Inventors: Douglas S. Reuben, 16 Owen St., Hartford, Conn. 06105; Ilan Reuben, 1843 San Ramon Ave., Berkeley, Calif. 94707

[21] Appl. No.: 188,616

[22] Filed: Jan. 27, 1994

[51] Int. Cl.$^6$ .............................. H04M 1/64; H04M 3/50
[52] U.S. Cl. .................. 379/88; 379/67; 379/89; 379/96; 379/142; 379/127; 379/201
[58] Field of Search .................. 379/67, 88, 89, 379/96, 142, 199, 201, 127

[56] References Cited

U.S. PATENT DOCUMENTS

| | | | |
|---|---|---|---|
| 5,283,818 | 2/1994 | Klausner et al. | 379/89 |
| 5,341,414 | 8/1994 | Popke | 379/69 |

OTHER PUBLICATIONS

"SPCS Customer Premises Equipment Data Interface", by Bell Communications Research, Inc.—Tech. Ref. TR-TSY-000030, Nov. 1988.
"DT1050Digitalker™ Standard Vocabulary Kit", 1980 National Semiconductor Corp, Dec. 1980, pp. 1–8.
"Advance Information: Calling Line Identification (CLID) Receiver with Ring Detector", Motorol Semiconductor Tech. Data, 1991, pp. 1–11.
"LCD Dot Matrix Modules; 16 Characters×2 Lines", Hardware Specifications of AND, Inc. pp. 4–14 to 4–15.
"LCD Dot Matrix Modules; Character LCD Modules Interface Data", Hardware Specifications of AND, Inc. pp. 5–20 to 5–33.
"Advance Information: Real–Time Clock Plus RAM (RTC)", Motorola Semiconductor Technical Data, Motorola, Inc, pp. 3–1653.

*Primary Examiner*—Jeffery A. Hofsass
*Assistant Examiner*—Scott Wolinsky
*Attorney, Agent, or Firm*—Anglin & Giaccherini

[57] ABSTRACT

A *Calling Number Display and Recording System* stores caller identification (CID) information (148) including a caller's telephone number and other pertinent information when a called party is not present and records the CID information (148) verbally for later replay or other use. The system integrates customer-owned telephone equipment (12, 17) with CID information (148) placed on a telephone carrier (144) by Central Office equipment. A calling party termination signal, known as a "Wink" signal (146), is used as a trigger to disconnect an answering device (17) from a telephone line (14) and to place decoded CID information (148), which is processed by control logic (38), at the end of any message (155) left by the caller. The processed information (76) may be displayed visually and announced by a voice synthesizer.

13 Claims, 6 Drawing Sheets

Microfiche Appendix Included
(1 Microfiche, 16 Pages)

CALLING NUMBER DISPLAY AND RECORDING SYSTEM

FIELD OF THE INVENTION

The present invention pertains generally to the field of telephonic communications and, more specifically, to the integration of telephone answering devices with calling party identification information signals carried on a telephone circuit.

REFERENCE TO MICROFICHE APPENDIX

Reference is made to the microfiche appendix which contains 1 sheet representing 16 frames of code for the control logic programing.

BACKGROUND OF THE INVENTION

The *Calling Number Display and Recording System* provides an apparatus which integrates customer-owned telephone equipment with the Calling Party Identification Service (CIDS). CIDS adds signals to the Central Telephone Switching Office signals that are conveyed on a telephone line between the Central Office and a telephone user. The CIDS signals that are added include calling party information such as the telephone number and area code of the telephone that initiates a call. Other information, such as the caller's name, is generally not provided by CIDS at the present time. CIDS is being implemented in many Local Exchange Carrier (LEC) markets as they become equipped with out-of-band signalling such as Signalling System 7 (SS7). The SS7 protocol is described in Communications Research ("Bellcore") documents TR-TSY-000030/000031, dated November, 1988. Some major areas which support the CIDS system include the states of Arizona, Connecticut, Florida, Massachusetts, Maryland, New Hampshire, New York, New Jersey, Nevada, Texas, Vermont, Virginia, the Province of Ontario, Canada and the Chicago metropolitan area. The service is being provided by companies including the New York and New England Telephone Companies (NYNEX), Bell Atlantic, Illinois Bell, Southern Bell, Bell South and Bell Canada, to name just a few. General Telephone and Electronics (GTE) and many other independent companies are also implementing CIDS on SS7 switched exchanges.

Intra-area telephone CIDS is being supplemented with inter-area CIDS. Federal legislation currently pending is expected to establish standards for CIDS implementation which will precede a homogeneous and universally applicable CIDS system. This legislation will further expedite nationwide, and eventually continent-wide, CIDS implementation.

Existing CIDS systems allow a called party to see the telephone numbers of the last twenty to fifty callers on special, integrated telephone receiver displays. There is, however, no existing system which integrates CIDS into existing customer-owned equipment. If the Local Exchange Carrier customer has purchased a CIDS receiver, and has also purchased an answering machine to receive and store incoming calls for later retrieval, there is no current system which integrates the answering machine or other customer-owned equipment with the CIDS information. The customer would greatly benefit if existing customer-owned equipment such as standard receivers, cellular telephones, facsimile machines and call diverters could be adapted to provide the benefits of retention and forwarding of CIDS information.

The problem of providing the telephone customer with the ability to record and use the CIDS information on existing customer-owned equipment such as answering machines or personal computers in a way that all of his or her other owned telephone equipment could be retained has presented a major challenge to designers of telephone equipment. A device which captures caller identification information from the Central Telephone Office signals, displays and records the information for later use, would represent a major technical advance in the telephonic communication field.

SUMMARY OF THE INVENTION

The *Calling Number Display and Recording System* method and apparatus disclosed and claimed solves the problem of recording and storing a calling party's telephone number and other pertinent information when the called party (hereinafter "user") is not present to answer a call. The invention provides an apparatus which integrates customer-owned telephone equipment with the Calling Party Identification Service (CIDS). The invention may be attached to a standard modular telephone outlet. Besides displaying the calling number the novel system will verbally announce and record a caller's telephone number. The recipient of a call may view the caller's telephone number on a display and may also listen to a voice synthesis announcement of the caller's telephone number at a later time. Optionally, the call can be relayed to other telephone numbers or to pagers based on the caller's number. The telephone number of the caller is correlated with any message left by the caller on an answering device integrated with the system and the called party's telephone. Even if the caller leaves no message, the invention can record the telephone number and other caller information.

Caller identification (CID) and other information is placed on the telephone carrier signal by Central Office equipment. CID information is detected in the present invention by a CID decoder, and stored for recording at the end of the caller's message. A telephone line status detector monitors the line for signals indicating whether a telephone receiver or other device is "Off Hook" and whether a calling party call termination, sometimes called a "Wink" signal, is present. The invention employs the "Wink" signal as a trigger to begin the information recording process by isolating an answering device from the telephone line so the stored information can be recorded. An answering device status detector continuously monitors the status of the answering device. The answering device also provides output signals that indicate answering device "hang up" and "quiet", that is, periods when there is no outgoing message being transmitted by the device. The system may be connected to many different answering devices, for example, a conventional telephone answering machine or a personal computer. Although these devices are cited as examples, it should be apparent to a person skilled in the art that other end devices may also be employed.

Outputs from the Caller ID decoder, including decoded CID information, presence of a frequency-shift-keying carrier which carries CID information and presence of ringing voltage, are routed to an input of a control logic device for processing. The output signals from the line status detector indicating presence of "Off Hook" devices and presence of the "Wink" signal are also routed to the input of the control logic device for processing. The output signals from the answering device status detector indicating answering device "hang up" and "quiet" are likewise routed to the control logic device. In one preferred embodiment, the control logic device has a microcontroller that responds to a reference clock-oscillator, a static random access memory (SRAM), an erasable programmable read only memory (EPROM), an input information signal device and an output control signal device, coupled together through an address bus and a data bus. The microcontroller is pre-programmed with program logic instructions stored in the EPROM as firmware. The program logic instructions control the functions of the system. The SRAM is used for storage of caller ID information and of data required for operation of the control logic device. The program logic tests the "Wink" signal for ambiguity such as Call Waiting or similar signals. Upon detecting the "Wink" signal indicating that a caller has hung up, the system also looks for audio signals on the line indicating that a message is issuing from the answering device. The program logic tests the "Wink" signal for ambiguity such as "Call Waiting" or similar signals present in analog exchanges. If, for example, a "Call Waiting" signal is received before the first calling party hangs up, the "Call Waiting" is detected and the system responds by waiting for the first caller to hang up before recording the CID information associated with the first call. If, after testing for Call Waiting ambiguity, the "Wink" signal is accepted as "true", the system waits for "quiet" on the telephone line, and then begins to record the CID information.

The system activities carried out under control of the pre-programmed microcontroller, in one of the preferred embodiments, follow these steps:

1. The system is initialized at user turn-on and then waits for a ring on the telephone line.
2. When a ring is received, CID information related to a first caller, which is placed on the telephone carrier by the Central Office, is decoded by the CID decoder and fetched by the microcontroller. The system then begins monitoring the status of the answering device.
3. If no decoded CID information is received, the system waits for a "Wink" signal to occur on the line, indicating the caller has terminated the call. The "Wink" signal is supplied by the Central Office when the caller hangs up. In the current protocol, the "Wink" is a 40 millisecond drop in the line voltage to near zero volts, after which normal line voltage is restored.
4. If decoded CID information is received, the CID information is processed and displayed on a visual display. The user may scroll through the displayed numbers to find CID information from previous calls.
5. If the user has elected to have the caller's number announced by setting the appropriate controls, the processed data are supplied to a voice synthesizer which converts the processed data to speech, and then feeds the speech output to a speaker. When enabled by a control signal, the speaker announces the number.
6. The answering device may transmit an outgoing message, inviting the caller to leave a message. If the caller leaves a message, it is recorded on the answering device.
7. After announcing the caller's number, or in the event no announcement is requested by the user, the system waits for the "Wink" signal to indicate the caller has completed his or her message. The system will detect an ambiguous signal, such as a "Call Waiting" signal used in analog telephone exchanges, and react to it as described in the steps below.
8. When a "Wink" signal is detected by the line status detector, a voltage pulse is conveyed to the microcontroller input. The microcontroller responds by sending a control pulse which de-energizes a switching device which controls the inputs to the answering device. The answering device is thereby temporarily isolated from the telephone line for the duration of the "Wink" signal and connected to the output of the voice synthesizer. A d.c. bias voltage is supplied to the answering machine to prevent it from hanging up.
8a. When the "Wink" signal has ended, the system is reconnected to the telephone line to check for signals that indicate a "Call Waiting". This signal is normally a second "Wink" signal occurring within a specified, short period of time.
8b. If such a signal should occur, the answering device is again isolated from the telephone line and supplied with the d.c. bias voltage. At the end of the signal period, the system returns again to the state of waiting for a "Wink" signal.
8c. If "Call Waiting" is detected, but a first "Wink" signal occurs indicating a second caller has hung up, the system returns to step 8.
8d. If after "Call Waiting" is detected a second "Wink" signal occurs, which indicates the first caller has hung up, the system again isolates the answering device from the telephone line and prepares to record the CID information on the answering device. Isolation from the line is necessary to prevent interference by further telephone line signalling such as a dial tone while recording the CID information on the answering device.
9. If there is still noise on the line, for example indicating an outgoing message is still playing, the answering device status detector so indicates and the system delays verbal recitation of the caller ID and waits for quiet. If the caller should hang up before the outgoing message is completed, the caller ID recorder may append a code to the CIDS information to notify the user that the caller hung up prematurely and stores the CID information for recording. The code is also contained in the visual display.
10. When the line is quiet, the microcontroller sends the CID information, and the time and date of the call, to the voice synthesizer where the CID data is converted to speech and recited so as to be recorded by the answering device. Time and date information is provided by the CIDS, or in the event that CIDS is not received or not available, a real-time clock is coupled to the control logic data bus. The user may elect to have the real time clock updated by CIDS, when available. The d.c. bias voltage continues to be applied until the system has recorded the CID information, time, date and other information.
11. If needed, a signal simulating the "Wink" signal is then sent to the answering device, causing it to hang up. In other embodiments, simulating the "Wink" signal may not be necessary to cause the answering device to hang up.
12. When the answering device status detector detects the answering device "hang up" signal, it supplies an output signal so indicating to the microcontroller input.
13. On receipt of the signal indicating answering device "hang up", the microcontroller outputs a control signal to the switching device which reconnects the answering device to the telephone line, completing the cycle.

Besides appending CID information to an incoming message, the current invention will also append, at the user's request, other information for example, time of day and date.

This gives the user the opportunity to organize a response. As a broader range of information becomes available from the CIDS system, such information may also be recorded with the current invention.

An appreciation of other aims and objectives of the invention and a more complete and comprehensive understanding of this invention may be achieved by studying the following description of a preferred embodiment and by referring to the accompanying drawings.

A BRIEF DESCRIPTION OF THE DRAWINGS

A DETAILED DESCRIPTION OF A PREFERRED EMBODIMENT

Figure 1:
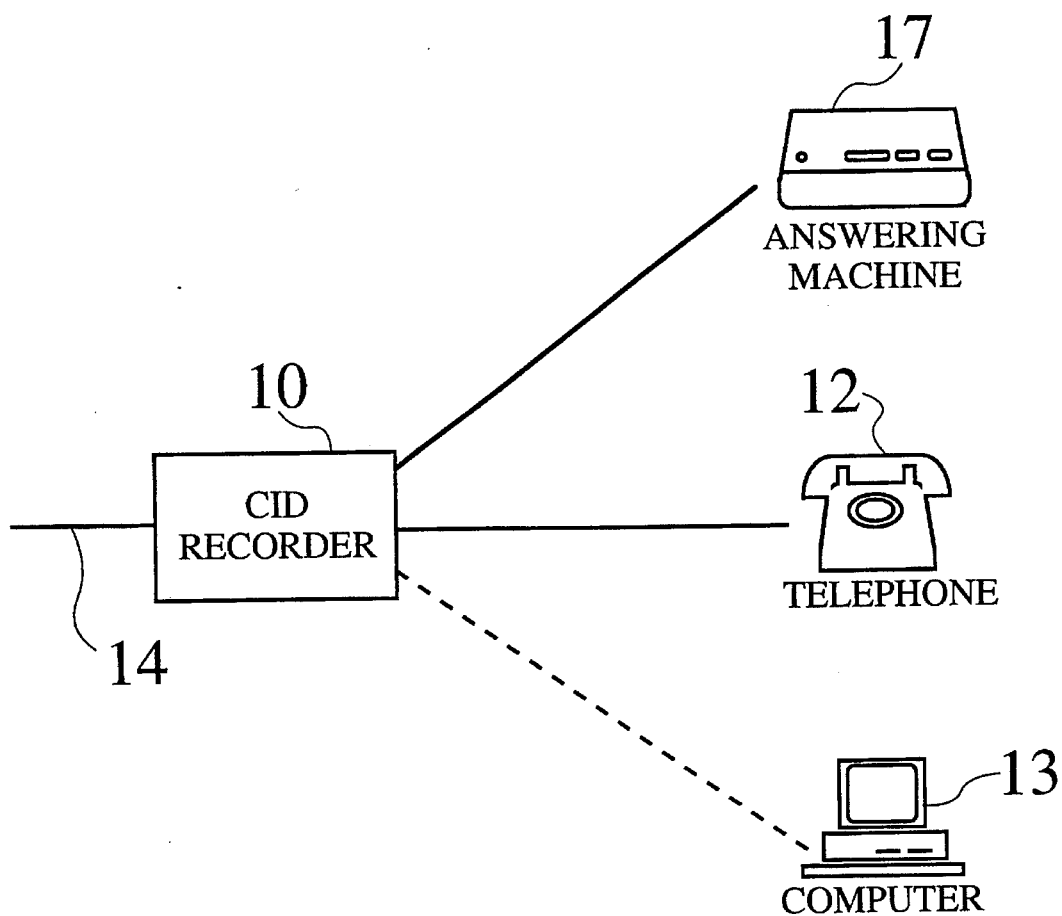
FIG. 1 is a schematic diagram of the *Calling Number Display and Recording System* showing the caller ID recorder portion of the invention and peripheral devices integrated with it.

FIG. 1 is a schematic diagram that shows the *Calling Number Display and Recording System*. The invention comprises a caller ID recorder 10 coupled to a telephone line 14 and integrated with a telephone receiver 12 and an answering machine 17. The caller ID recorder 10 may be coupled to other end devices such as a personal computer 13 as shown. In the following discussion, the "calling party" is the one originating a telephone call. The "called party" or "user" is the one receiving the call.

Figure 2:
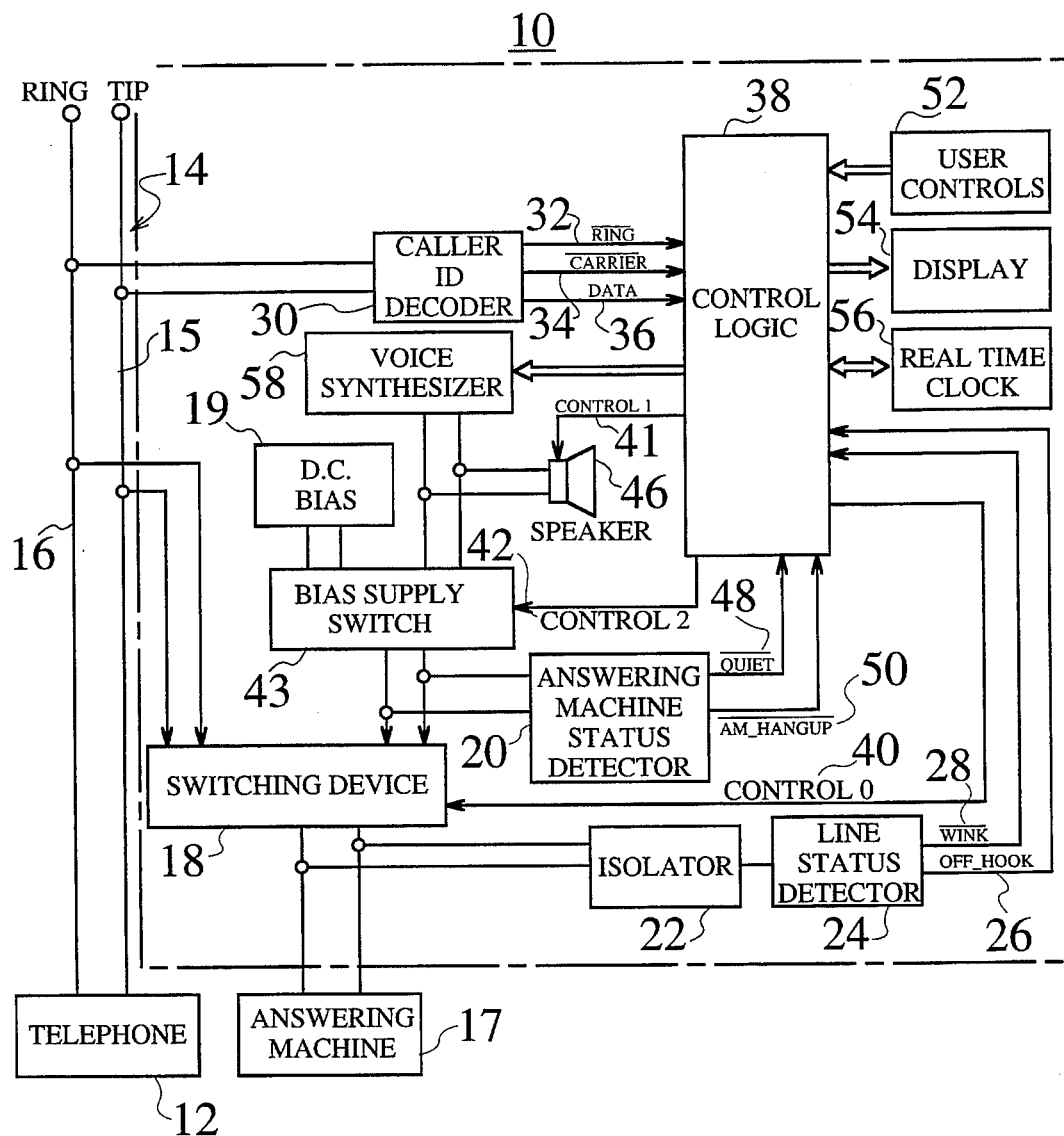
FIG. 2 is a schematic, block diagram of the *Calling Number Display and Recording System*.
Figure 3:
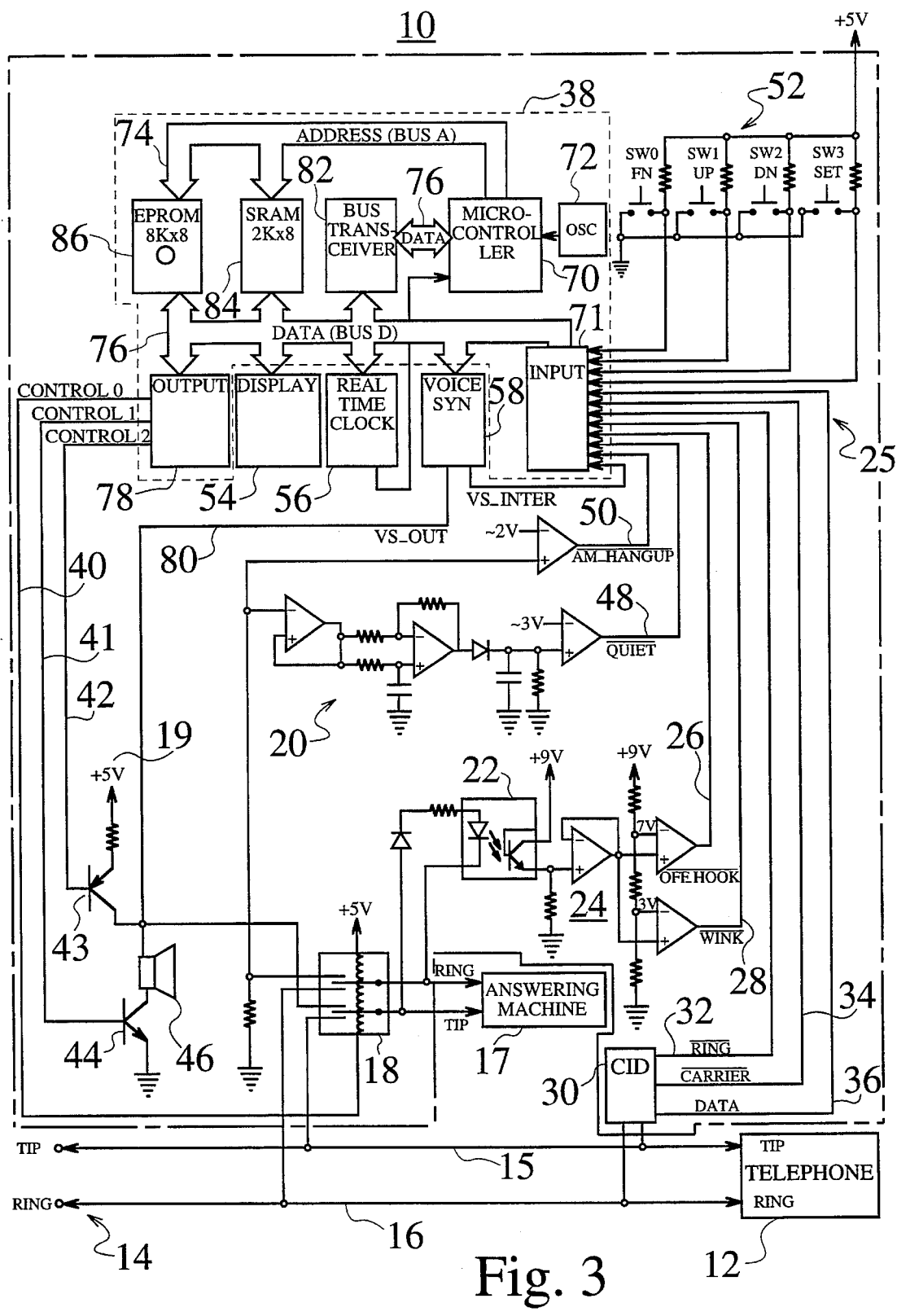
FIG. 3 is a more detailed schematic diagram of a preferred embodiment of the invention showing additional elements of the system control logic, line status detector and answering device status detector.
Figure 4:
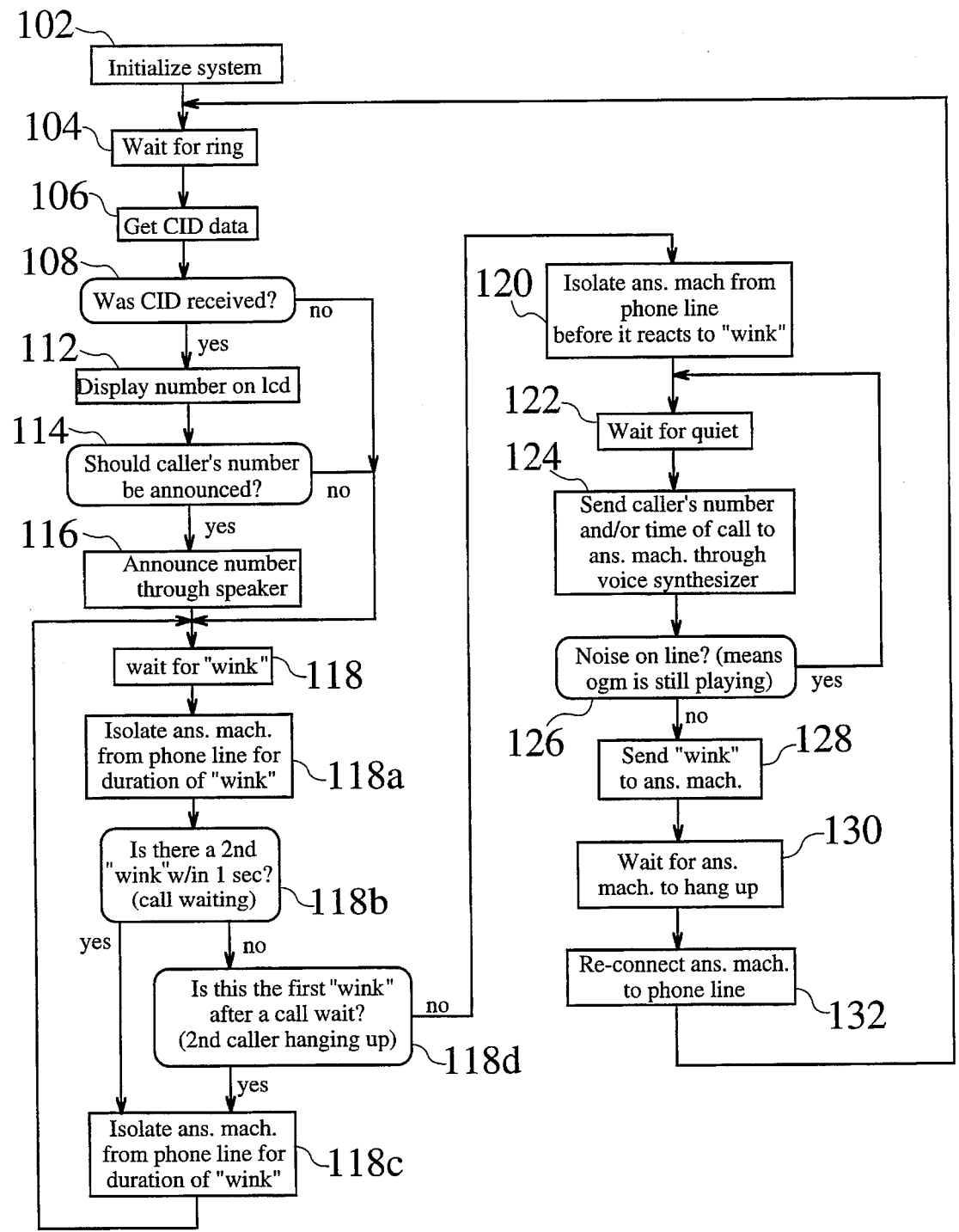
FIG. 4 is a flow diagram of the system operation which helps to understand the system functions.
Figure 5:
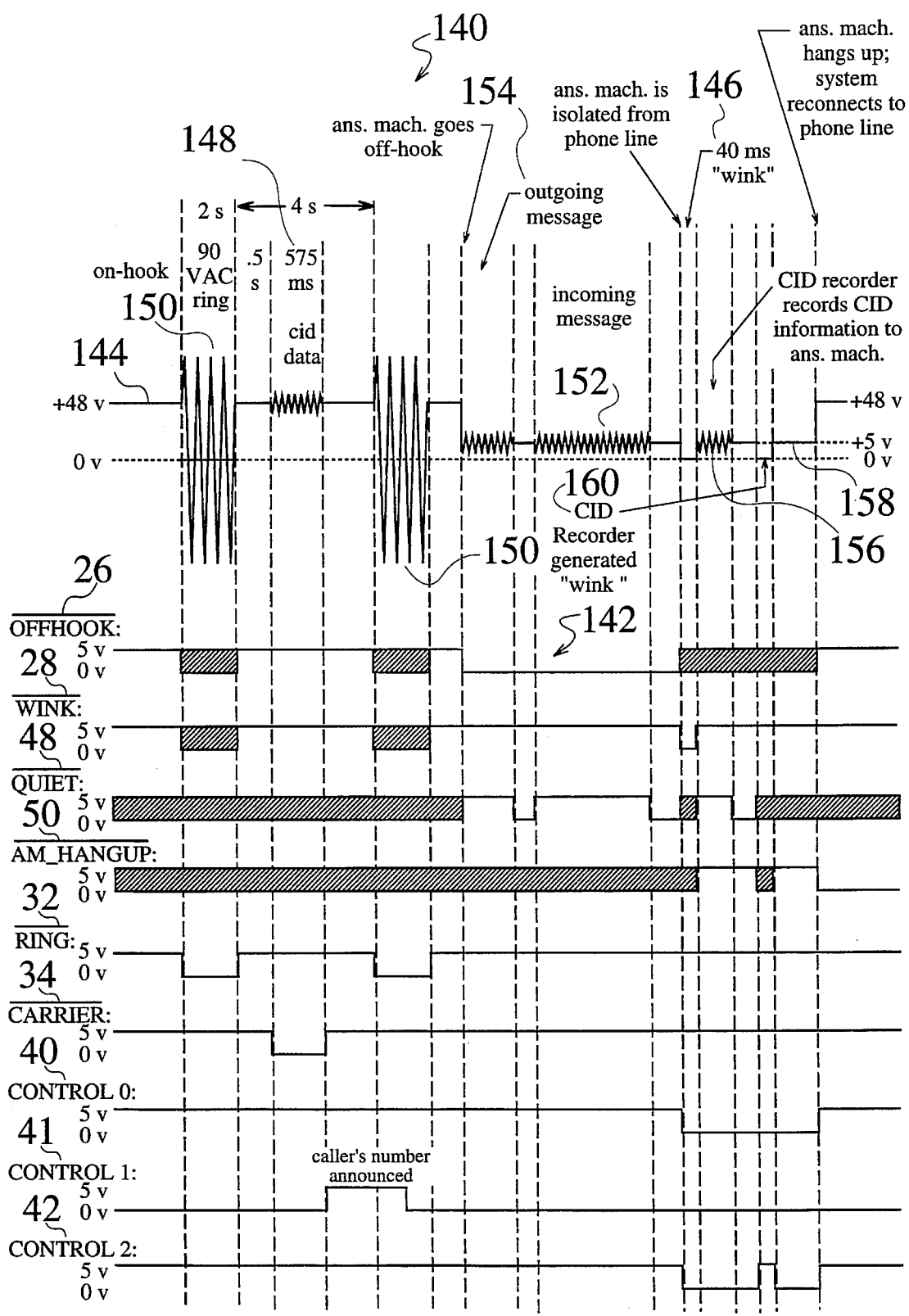
FIG. 5 is schematic diagram of Central Office signals timing, detected signals output timing and control signals timing resulting from detection and processing of the Central Office signals carried on the telephone line.
Figure 6:
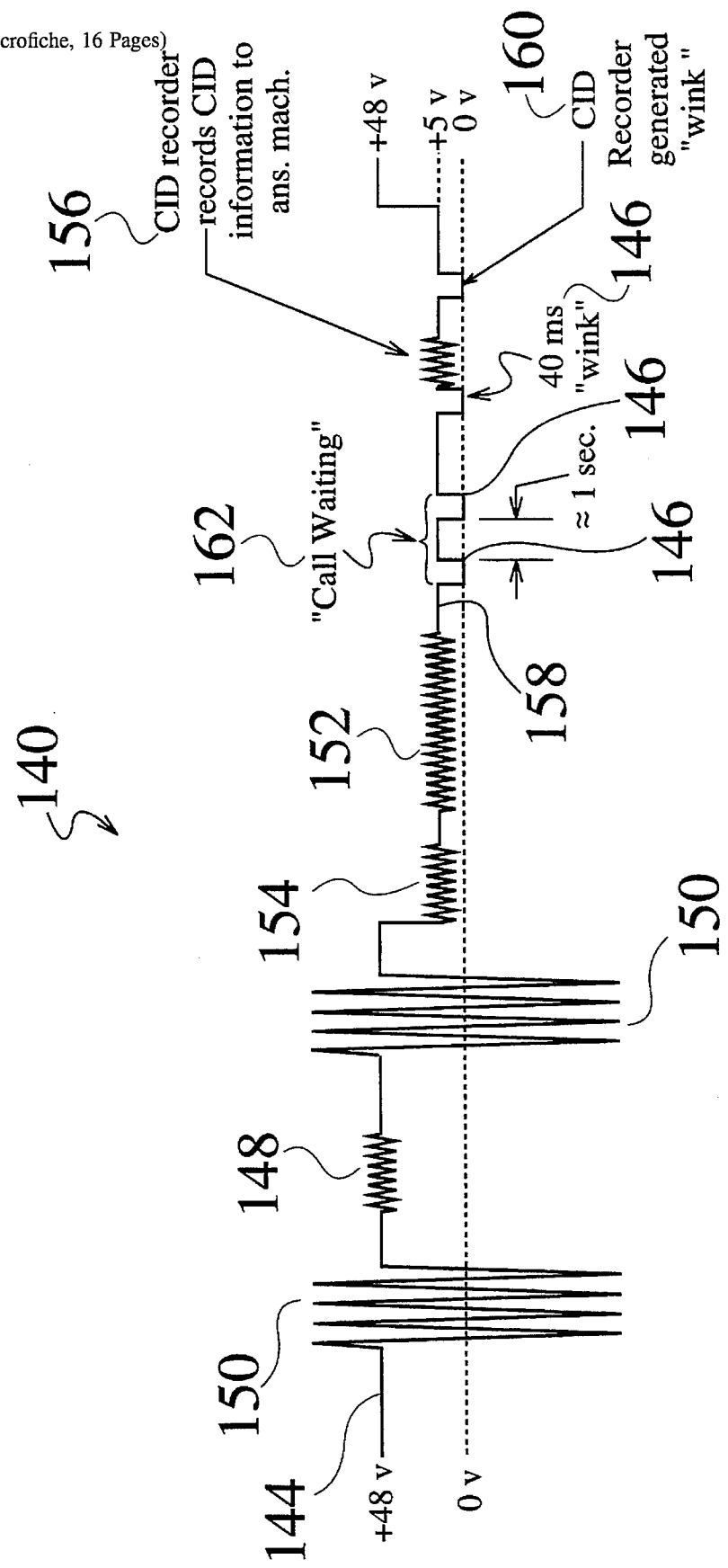
FIG. 6 is schematic diagram of Central Office signals timing showing that the system discriminates a "Call Waiting" signal which has characteristics similar to the "Wink" signal.

The subsystems of a preferred embodiment of the *Calling Number Display and Recording System* are depicted in FIG. 2. These subsystems are coupled together and to the telephone line 14 as shown in FIGS. 2 and 3. A description of the subsystems of the caller ID recorder 10 and their integration with the answering machine 17 and telephone 12 is presented below:

FIG. 4 depicts the flow of operations of the system. FIGS. 5 and 6 depict schematically the typical telephone line signal timing 140 for signals placed on the telephone carrier 144 by the Central Office. The signals which may be present are:

1. A +48 volts d.c. carrier 144; '2. A 90–110 volts a.c. ring signal 150;
3. An "Off Hook" condition voltage 158 of +5 volts d.c. carrier;
4. Incoming message audio signal 152;
5. "Wink" signal 146, a drop from +5 volts d.c. to zero volts d.c.; and
6. "Call Waiting" signal 162, two "Wink" signals within one second.

Signals sent to the answering machine by the *Calling Number Display and Recording System* are shown in FIGS. 5 and 6 as a CID data recording signal 156 and a system-generated "Wink" 160. The CID data recording signal 156 is derived from the voice synthesized output (VS_OUT) 80 of processed data 76. The outgoing message audio signal 154 is normally placed on the answering machine 17 by the user, the answering machine 17 places the audio signal 154 on the telephone line 14.

FIG. 5 also depicts the timing of detected output and control signals 142. These are responses by system elements to the typical telephone line signals 140 appearing on the telephone carrier 144.

Caller ID Recorder 10

FIGS. 2, 3, 5 and 6 reveal the details of the Caller ID Recorder 10. Within the caller ID recorder 10, the principal subsystems comprise a CID decoder 30, a line status detector 24 and a line isolator 22, an answering machine status detector 20, control logic 38, a voice synthesizer 58, a visual display 54, a speaker 46 and speaker control switch 44, a real-time clock 56, a switching device 18, a d.c. bias supply 19, and user controls 52.

The signal flow diagram of FIG. 5 depicts the typical signal voltages on a telephone carrier 144 at various line status conditions. When the telephone receiving devices 12,17 are "on hook", the telephone carrier voltage is held at about +48 volts d.c. An incoming call causes a ring voltage 150 of about 90–110 volts a.c. to be impressed on the telephone carrier 144 before the call is answered. When the user's telephone 12 or answering machine 17 answers the call by going "Off Hook", the telephone carrier 144 voltage drops to about +5 volts d.c. The ring voltage 150 has a duty cycle of about two seconds on and four seconds pause between rings. During the four second pause between the first and second rings, +48 volts d.c. telephone carrier 144 is modulated for about 575 milliseconds with CID information 148 by the Central Office, beginning about 0.5 seconds after the ring voltage 150 pause begins. It is this CID information 148 which is detected, captured, displayed and saved for later use by the actions of the caller ID recorder 10.

CID Decoder 30

The purpose of the CID decoder 30 is to detect the caller ID information 14, and ring signal 150 on the telephone carrier 144. The CID decoder 30 has inputs coupled to the tip side 15 and ring side 16 of the telephone line 14, the so-called "twisted pair". CID decoder outputs 32, 34 and 36 are coupled to the control logic 38. The CID decoder 30 monitors the telephone line 14 for ring voltage 150 and CID information 148.

When CID information 148, placed on the telephone carrier 144 by the Central Office, is detected, it is demodulated by the CID decoder 30 producing CID data output 36. The CID information 148 is typically carried on a Bell 202, 1200 baud, frequency-shift-keying asynchronous data signal. When a frequency-shift-keying ("FSK") carrier signal for the CID information 148 is detected on the telephone line 14, a carrier detection output 34 is produced by the caller ID decoder 30. When a ring voltage 150 is detected, a ring detection output 32 is produced by the caller ID decoder 30. The ring detection output 32, the carrier detection output 34, and a caller ID data output 36 are fed to the control logic 38. The caller ID decoder 30 may be a Motorola MC145447 silicon gate HCMOS integrated circuit or similar device.

Line Status Detector 24

A first and most important purpose of the line status detector 24 is to detect the calling party call termination signal or so-called "Wink" signal 146 which occurs on the telephone carrier 144 when a telephone transmitting device at the calling location hangs up. The "Wink" signal 146 is typically 40 milliseconds in duration. During its presence, the telephone line 14 voltage drops to about zero volts d.c. A second purpose of the line status detector 24 is to detect an "Off Hook" condition 158 of the telephone carrier 144. When a receiving device 12, 17 is "Off Hook", the telephone carrier voltage is about 5 volts d.c.

The line status detector 24 has inputs coupled to the telephone line 14 and has outputs coupled to the control logic 38. To protect the telephone line 14 from any spurious voltages fed back from the line status detector 24, the line status detector 24 is isolated from the telephone line 14 by means of an isolator 22. The isolator is an FCC Part 68 device and may be a device which uses optical coupling between its input and output, as an example.

The "Wink" signal 146 is often used by telephone answering equipment such as the answering machine 17, to signify that the caller has left the telephone line 14. Such equipment is typically programmed to respond by quickly hanging up, that is releasing the line, when a "Wink" signal 146 is detected. When the answering machine 17 hangs up, it is of course no longer possible to place information on the device. Intervention by the caller ID recorder 10 withholds the "Wink" signal 146 from the answering machine 17, making it possible for that device to accept additional information.

In the present invention, the occurrence of the "Wink" signal 146 is used as a key event in the flow of CID information display and recording activities. The use of the "Wink" detection output signal 28 to control the actions of the answering machine 17 is a basic feature of this invention. The function of the "Wink" detection output signal 28 is discussed more fully below in the description of the control logic 38 and in the discussion of the logic flow diagram of FIG. 4. When a "Wink" signal 146 is detected by the line status detector 24, a drop in voltage to near zero of the "Wink" detection output signal 28 from the line status detector is produced for about 40 milliseconds. The "Wink" detection output signal 28 is furnished to the control logic 38.

An "Off Hook" condition voltage 158 is a telephone carrier voltage 144 of about +5 volts d.c. and occurs with the lifting of the receiver of a telephone 12 or other answering device 17 connected to the telephone line 14. When the line status detector detects an "Off Hook" signal 158, an "Off Hook" detection signal 26 is produced and sent to the control logic 38.

Answering Device Status Detector 20 and Switching Device 18

The purpose of the answering device status detector 20 is to detect the status of the answering machine 17 and provide output signals to the control logic 38 indicative of that status. The answering device status detector 20 signals the control logic 38 by producing an "Answering machine hang up" signal (AM_HANGUP) 50 when the answering machine 17 hangs up and a "Quiet" signal 48 when there are no outgoing or incoming messages. The answering device status detector 20 is coupled to the answering machine 17 through a switching device 18. The switching device 18 may be a relay or comprise transistor or other switches. It is controlled by a control signal output 40 produced by the control logic 38.

Visual Display 54, Voice Synthesizer 58 and Real-Time Clock 56

The visual display 54 presents a display of the CID information 148 to the user. The visual display 54 may be a liquid crystal device (LCD) such as an AND491 (AND Division of William J. Purdy Co.), a light emitting diode (LED) or a similar device. A voice synthesizer 58 is used to convert the decoded and processed CID information 148 into speech signals. The voice synthesizer 58 receives its inputs from the data bus D as processed data 76. It produces a voice synthesized output (VS_OUT) 80. The voice synthesized output (VS_OUT) 80 is used to announce the decoded and processed CID on the speaker 46 and for recording on the answering machine 17. The voice synthesizer 58 may be a National Semiconductor DT1050 DIGITALKER™ or similar device. A real-time clock 56 provides current time and date information. This information is appended to the processed data 76 when recorded. If no CID information 148 has been received, the time and date is still provided for recording. The real-time clock 56 may be a Motorola™ Semiconductor MC146818 or similar device.

User Controls 52

The user is provided with user controls 52 with which to set certain functions or attributes to better suit his or her needs. These may include turning on a "light" warning if there is an incoming call, disconnecting the answering machine 17 from the telephone circuit, selection and setting of time of day, date, etc., scrolling through a list of received telephone numbers, selection of a speaker and speaker volume for announcement of the caller ID.

Control Logic 38

The purpose of the control logic 38 is to receive input signals 25, generate a record of the incoming CID information 148 and provide control signal outputs 40, 41, 42. These outputs control the operation of the switching device 18, the answering machine 17, the bias supply switch 43 and the speaker switch 44. The control logic 38 processes the signal inputs 25 to produce processed data 76. The control logic 38 controls the flow of processed data 76 to the information display 54, the voice synthesizer 58 and real time clock 56. The input signals 25 are the output signals 32, 34, 36 from the CID decoder 30, the output signals 26, 28 from the line status detector 24, the output signals 48, 50 from the answering device status detector 20 and outputs from the user controls 52.

The control logic 38 includes a pre-programmed microcontroller 70 which has an address bus A and a data bus D by which address control signals 74 and the processed data 76 are sent to the subsystems of the caller ID recorder 10. Pre-programmed instructions for the microcontroller 70 are stored in an erasable programmable read only memory (EPROM) 86. A static random access memory (SRAM) 84 is provided to store intermediate and final products of data processing. The microcontroller receives CID data 36 through an input device 71 and a bus transceiver 82. The microcontroller 70 transmits control signals 40, 41, 42 through an output device 78. The microcontroller 70 is itself controlled by a reference clock 72. A more detailed description of the microcontroller 70 and its ancillary devices is presented below. A listing of code for the control logic programming is contained in the microfiche appendix.

The control logic 38 controls the output of the bias supply 19 which supplies a voltage to the answering machine 17 to keep it from hanging up when a "Wink" signal 146 occurs on the telephone line. After a caller hangs up and during detection and duration of the ensuing "Wink" signal 146, a voltage equivalent to the "Off Hook" condition voltage 158 is applied to the answering machine 17 through the switching device 18 controlled by control 0 signal 40. The bias supply 19 applies this voltage when enabled by control 2 signal 42 operating on the bias switch 43. At this time, the control logic 38 also disconnects the answering machine 17 from the telephone line 14 and connects VS_OUT 80 to the answering machine for recording. Application of bias supply 19 voltage is referred to as "Wink" suppression in the following discussion.

The control logic 38 processes CID data output 36 which is temporarily stored in the SRAM 84 as processed data 76. The processed data 76 which contains the CID information 148, is sent via the data bus D to the visual display 54 and the voice synthesizer 58 for conversion to VS_OUT 80 for immediate announcement on the speaker 46, if desired, and for recording on the answering machine 17.

During the period of the "Wink" signal 146 suppression, the control logic 38 supplies a control signal (control 0) 40 to the switching device 18 which removes the caller ID recorder 10 and the answering device 17 from the telephone line 14. This isolation prevents any interference from damage to the Central Office equipment. In the embodiment shown, the control 0 signal 40 de-energizes a normally closed relay in the switching device 18 which causes the relay to break connection with the telephone line 14 and to connect the answering device 18 to the voice synthesizer output (VS_OUT) 80. The control 2 signal 42 operates a bias supply switch 43 which keeps the bias supply 19 voltage applied to the answering machine 17 preventing it from hanging up. During this period, the voice synthesizer 58 converts the processed data 76 into VS_OUT 80, which is then sent to the answering machine 17 and recorded.

When VS_OUT 80 has been recorded on the answering machine 17, the control logic 38 can send, if needed, a substitute "Wink" signal 146 to the answering machine 17 via the control 2 signal 42, causing the answering machine 17 to hang up. When the answering machine 17 hangs up, the control logic 38 reconnects the answering machine 17, via the control 0 signal 40, to the telephone line 14 to await another call.

Control Logic 38 Microprocessing

A device such as the Synertek SY6502A may be used as the microcontroller 70. The software operating code which programs the microcontroller 70, is stored in the EPROM 86. The EPROM 86 may comprise one 8-kilobyte chip such as Advanced Micro Devices AM27C64. An oscillator serves as the reference clock 72 for the microcontroller 70. A typical frequency for the reference clock 72 is 1 Mhz. The SRAM 84 is used to store processed data 76 in intermediate or final form. The SRAM 84 may comprise one 2-kilobyte chip such as the Hitachi HM6116 device.

The CID decoder 30, line status detector 24, answering device status detector 24 output signals 26,28,32,34,36,48, 50 and user controls 52 signals are applied as input signals 25 to the microcontroller 70 through an input device 71 to a data bus D. Two Texas Instruments SN74LS241N or similar devices may serve as the input device 71. The bus transceiver 82 is a device through which the microcontroller 70 receives the input signals 25 from and provides output signals to the data bus D. A device such as National Semiconductor DM74LS245N may be used as the bus transceiver 82.

The control output signals 40,41,42 are supplied to the switching device 18, bias supply switch 43 and the speaker switch 44 through the output device 78. A Texas Instruments SN74LS174N or similar device may be used as the output device 78. Caller ID information 148 in the form of demodulated caller ID data output 30 are processed and the processed data 76 are sent to the visual display 54 and the voice synthesizer 58 over the data bus D. Voice synthesizer output (VS_OUT) 80 is sent to a speaker 46 and to the answering machine 17 through the relay contacts of the switching device 18.

The microcontroller 70 responds to the pre-programmed instructions stored in the EPROM 86 to process the input signals 25. The flow of instructions and processed data 76 on the data bus D is controlled conventionally by address signals 74 sent by the microcontroller 70 over the address bus A. The processed data 76 and the control signals 40,41,42 issued by the microcontroller 70, produce the flow of system operations discussed above. A listing of the programming code for a preferred embodiment of the caller ID recorder 10 may be found in Appendix A. The code was assembled on the LISA™ assembler, sold by On-Line Systems for the Apple II™ computer.

Caller ID Recorder 10 System Logic Flow

The logic flow of activities in a preferred embodiment of the system, shown in FIG. 3, is depicted in FIG. 4. The logic steps are described below:

*"Initialize System"* 102

The caller ID recorder 10 is initialized by turn-on by the user. The real time clock 56 and visual display 54 are initialized.

*"Wait for Ring"* 104

The system waits for a calling party's ring signal 150 on the telephone line 14. When a ring signal 150 is detected on the telephone carrier 144 by the caller ID decoder 32, a ring detection signal 32 is sent to the microprocessor 70 resident in the control logic 38.

*"Get CID Data"* 106

If an FSK carrier signal for the CID information 148 is detected by the CID decoder 32, a carrier detection signal 34 is sent to the microprocessor 70. CID information 148 which is placed on the telephone carrier 144 by the Central Office between ring signals 150 is then demodulated by the caller ID decoder 32 producing CID data output 36. The CID data output 36 is fetched by the microcontroller 70 resident in the control logic 38.

*"Was CID Data Received?"* 108

If CID information 148 are demodulated by the CID decoder 30 and the resulting CID data output 36 is received by the microcontroller 70, the CID data output 36 is processed by the microcontroller 70 which sends the processed data 76, via the data bus D, to the visual display 54 and stores the processed data 76 on the SRAM 84. If no CID information 148 are detected by the CID decoder 30, the microcontroller 70 logic jumps to step 118 to wait for a "Wink" signal 146.

*"Display Number on LCD"* 112

The processed data 76 is displayed on the visual display 54 to the user and added to any processed data 76 previously sent to the visual display 54. The user may scroll through the displayed numbers to find CID information from previous calls.

*"Should Caller's ID be Announced?"* 114

If the user has elected to have the caller's number announced by setting the appropriate user controls 52, the CID data output 36 is processed by the microcontroller 70 and the processed data 76 are supplied to the voice synthesizer 58 which converts the processed data 76 to voice synthesized output (VS_OUT) 80.

*"Announce The Number Through The Speaker"* 116

VS_OUT 80 is fed to a speaker 46 which is enabled by a control signal (control 1) 41 operating through a speaker switch 44 and the number is announced. If the user has elected not to have the caller's number announced, the speaker switch 44 is held disabled by the control 1 signal 41, and no announcement is made (step 116 is bypassed).

*"Wait for 'Wink'"* 118

After the announcement over the loud speaker 46, or in the event no announcement is requested by the user, the Caller ID Recorder System 10 waits for the "Wink" signal 146 on the telephone carrier 144 to indicate the caller has completed his or her message. The answering machine 17 may transmit a recorded message which invites the caller to leave a message. If the caller leaves a message, it is recorded on the answering machine 17.

*"Isolate Answering Machine from Phone Line for Duration of 'Wink'"* 118a

When a "Wink" signal 146 is detected by the line status detector 24, a voltage pulse is output to the microcontroller input 71. The microcontroller 70 responds by sending a control pulse which de-energizes the switching device 18. The answering machine 17 is thereby disconnected from the telephone line 14. The answering machine 17 is then supplied with a d.c. bias voltage supplied by the bias supply 19 for the duration of the "Wink" signal. The answering machine status detector 20 begins monitoring status of the answering machine 17 after it is isolated from the telephone line 14.

*"Is there a second 'Wink' within one second?"* 118b

Older analog local exchange switches have "Call Waiting" and "Three-way Calling" features which cause a brief drop in line voltage similar to the "Wink" signal 146. Therefore, when the "Wink" signal has ended, the answering machine 17 is reconnected to the telephone line 14 to check for signals indicative of a "Call Waiting" signal 162, normally a second "Wink" signal 146 occurring within one second of the first "Wink" signal 146.

*"Isolate Answering Machine from Phone Line for Duration of 'Wink'"* 118c

If a second "Wink" signal 146 should occur within the specified period, the answering device 17 is again isolated from the telephone line 14 and supplied with the d.c. bias voltage from the bias supply 19. At the end of the signal period, the system returns to the state of waiting for a "Wink" signal 146.

*"Is This The First 'Wink' signal after 'Call Waiting'?"* 118d

If a "Call Waiting" signal 162 is detected, but a "Wink" signal 146 occurs which indicates a second caller has hung up, the system returns to step 118 to await a "Wink" signal indicating the caller for whom CID information 148 may have been received has hung up. If this is a second "Wink" signal after a "Call Waiting " signal 162 is detected, the microcontroller 70 proceeds to prepare to record CID information 148.

*"Isolate Answering Machine from Phone Line Before It Reacts To 'Wink'"* 120

When a "Wink" signal 146 indicating the caller, for which CID information 148 may have been received has hung up, is detected by the line status detector 24, a voltage pulse is output to the microcontroller input 71. The microcontroller 70 responds by sending a control pulse which de-energizes the switching device 18. The answering machine 17 is disconnected from the telephone line 14 and connected to the voice synthesized output (VS_OUT) 80 of the voice synthesizer 58. A control signal (control 2) 42 causes a bias supply switch 43 to connect the bias supply 19 to the answering machine 17 preventing it from hanging up. The bias supply 19 is connected to the "Tip" input of the answering machine 17. The bias supply 19 is capable of continuously supplying a d.c. bias voltage to the answering machine 17.

*"Wait for Quiet"* 122

The microprocessor 70 performs a test for audio noise produced by the answering machine 17. If there is noise, for example, indicating outgoing message 154, "Quiet" signal output 48 so indicates and the system returns to "Wait For Quiet" 122 condition and thereby delays verbal recitation of the caller ID. In the case of a calling party's premature termination, the system, upon detecting silence, will then prepare to record the caller ID information 148.

*"Send Caller's Number and Time of Call to Answering Machine through Voice Synthesizer"* 124

When the line is quiet, the microcontroller 70 retrieves from storage 84 and sends the processed data 76 containing the CID information 148, and optionally the time and date of the call, to the voice synthesizer 58 where it is converted to VS_OUT 80. VS_OUT 80 is then recorded by the answering machine 17. Time and date information is provided by CID information 148, or if unavailable, by the real-time clock 56.

*"Noise On Line?"* 126

Between words being output by the voice synthesizer 58, a short time gap of a few milliseconds exists. Noise detected in that gap indicates that the outgoing message (O.G.M.) is still being transmitted on the telephone line 14. If there is still noise, the system returns to "Wait For Quiet" 122 before recording VS_OUT 80. If the line is quiet, VS_OUT 80 is recorded, and the system proceeds to "Send 'Wink' to the answering machine" 128.

*"Send 'Wink' to the answering machine"* 128

The bias supply 19 voltage is applied to the answering machine 17 for the duration of the "Wink" detection output signal 28 and continues until the answering machine 17 has recorded the speech signals on VS_OUT 80. When the voice synthesizer 58 indicates to the microprocessor 70 that it has finished synthesizing the last word, microprocessor 70 sends a signal simulating the "Wink" signal 146 to the answering machine 17, if needed, causing it to hang up.

*"Wait for Answering Machine To Hang up"* 130

When the answering device status detector 48 detects the answering machine 17 has hung up, it supplies an "Answering machine hang up" signal (AM_HANG UP) 50, so indicating to the microcontroller 70, through the input device 71.

*"Reconnect Answering Machine To The Phone Line"* 132

On receipt of the AM_HANG UP signal 50, the microcontroller 70 sends a Control 0 signal 40 which de-energizes the switching device 18. The relay contacts go to the normally closed position, reconnecting the CID recorder 10 to the telephone line 14, completing the cycle. The system executes a return-to-initialized state to await another ring 150 (step 104).

CONCLUSION

Although the invention has been described in detail with reference to a particular preferred embodiment, persons possessing ordinary skill in the art to which this invention pertains will appreciate that various modifications and enhancements may be made without departing from the spirit and scope of the claims that follow. The various devices which have been disclosed above and the programming code disclosed in the Appendix are intended to educate the reader about one preferred embodiment and are not intended to constrain the limits of the invention or the scope of the claims. The List of Reference Characters which follows is intended to provide the reader with a convenient method of identifying elements of the invention in the specification and drawings. This list is not intended to delineate or narrow the claims.

LIST OF REFERENCE CHARACTERS

FIG. 1

10 Caller ID recorder

12 Telephone
13 Personal computer
14 Telephone line ("twisted pair")
17 Answering machine
FIG. 2
10 Caller ID recorder
12 Telephone
14 Telephone line ("twisted pair")
15 Tip input side of telephone line
16 Ring input side of telephone line
17 Answering machine
18 Switching device
19 D.C. bias supply
20 Answering machine status detector
22 Circuit isolator
24 Line status detector
25 Input signals to control logic
26 Off hook signal detection output
28 "Wink" signal detection output
30 CID decoder
32 Ring detection output
34 Carrier detection output
36 CID data output
38 Control logic
40 Control 0 signal
41 Control 1 signal
42 Control 2 signal
43 Bias supply switch
46 Speaker
48 "Quiet" signal output
50 "Answering Machine Hang Up" (AM_HANGUP) signal
52 User controls
54 Visual display
56 Real time clock
58 Voice synthesizer
FIG. 3
10 Caller ID recorder
12 Telephone
14 Telephone line ("twisted pair")
15 Tip input side of telephone line
16 Ring input side of telephone line
17 Answering machine
18 Switching device
19 Bias supply
20 Answering machine status detector
22 Circuit isolator
24 Line status detector
25 Input signals to control logic
26 Off hook signal detection output
28 "Wink" signal detection output
30 CID decoder
32 Ring detection output
34 Carrier detection output
36 CID data output
38 Control logic
40 Control 0 signal
41 Control 1 signal
42 Control 2 signal
43 Bias supply switch
44 Speaker switch
46 Speaker
48 "Quiet" signal output
50 "Answering Machine Hang Up" (AM_HANGUP) signal
52 User controls
54 Visual Display
56 Real time clock
58 Voice synthesizer
70 Microcontroller
71 Input device
72 Reference clock
74 Address signals
76 Processed data
78 Output device
80 Voice synthesized output (VS_OUT)
82 Bus transceiver
84 Static random access memory (SRAM)
86 Erasable programmable read only memory (EPROM)
A Address bus
D Data bus
FIG. 4—System Flow Steps:
102 Initialize System
104 Wait for Ring
106 Get CID Data
108 Was CID Received?
112 Display Number on LCD
114 Should Caller's Number be Announced?
116 Announce Number Through Speaker
118 Wait for "Wink"
118a Isolate Answering Machine From Telephone Line For Duration Of "Wink"
118b Is There A Second "Wink" within 1 second? ("Call Waiting")
118c Isolate Answering Machine From Wall For Duration Of "Wink"
118d Is this the First "Wink" After a "Call Waiting"?
120 Isolate Answering Machine From Telephone Line Before It Reacts to "Wink"
122 Wait for "Quiet"
124 Send Caller's Number and/or Time of Call to Answering Machine Through Voice Synthesizer
126 Noise on Line?
128 Send "Wink" to Answering Machine
130 Wait for Answering Machine to Hang Up
132 Reconnect Answering Machine to Telephone Line
FIG. 5
26 "Off Hook" detection signal output
28 "Wink" signal detection output
32 Ring signal output
34 Carrier detection signal output
40 Control 0 signal
41 Control 1 signal
42 Control 2 signal
50 AM_HANGUP signal 140 Typical telephone line signals
142 Detected output signals and control signals timing
144 Telephone carrier voltage
146 "Wink" signal
148 Caller ID (CID) information
150 Ring voltage
152 Incoming message audio signal
154 Outgoing message audio signal
156 CID data recording signal
158 "Off Hook" condition voltage
160 Caller ID Recorder-generated "Wink"

FIG. 6

140 Typical telephone line signals
144 Telephone carrier voltage
146 "Wink" signal
148 Caller ID (CID) information
150 Ring voltage
152 Incoming message audio signal
154 Outgoing message audio signal
156 CID data recording signal
158 "Off Hook" condition voltage
160 Caller ID Recorder-generated "Wink"
162 "Call Waiting" signal

What is claimed is:

1. An apparatus for processing telephone signals (140) carried on a telephone line (14), said telephone signals (140) including incoming messages (152), caller identification (CID) information (148), a calling party call termination ("Wink") signal (146), and an "Off Hook" condition voltage (158), said apparatus comprising:

an answering device (17) coupled to said telephone line (14);

a caller ID recorder means (10) for receiving said telephone signals (140), decoding said CID information (148) carried on said telephone signals (140) and detecting said "Wink" signal (146); said caller ID recorder means (10) having a control logic means (38) for generating an output (VS_OUT) (80) derived from said CID information (148) received, said caller ID recorder means (10) coupled to said telephone line (14);

a visual display means (54) for visually displaying said CID information (148); said visual display means (54) coupled to said control logic means (38); and an audio means (46) for announcing said output (VS_OUT) (80);

said audio means (46) coupled to said control logic means (38);

said control logic means (38) distinguishing said "Wink" signal and responding to said "Wink" signal (146) by disconnecting said answering device (17) from said telephone line (14) and preventing said "Wink" signal from reaching said answering device (17) to cause it to hang up, said control logic means (38) sending said output (VS_OUT) (80) to said answering device (17) where said output (VS_OUT) (80) is recorded.

2. The apparatus as claimed in claim 1 in which said CID information includes a caller's telephone number.

3. The apparatus as claimed in claim 1 in which said output (VS_OUT) (80) is voice synthesized speech.

4. An apparatus for processing telephone signals (140) carried on a telephone line (14), said telephone signals (140) including a frequency-shift-keying carrier signal, caller identification (CID) information (148) carried on said frequency-shift-keying carrier, a ring signal (150), incoming messages from a calling party (152), a calling party call termination ("Wink") signal (146) and an "Off Hook" condition voltage (158), said apparatus comprising:

an answering device (17) coupled to a telephone line (14);

control logic (38) coupled to said answering device (17), a caller identification (CID) decoder means (30) for decoding said CID information (148) carried on said frequency-shift-keying carrier signal and for producing a plurality of information output signals (32,34,36) indicative of said frequency-shift-keying carrier signal, said CID information (148) and said ring signal (150); said CID decoder means (30) having an input coupled to said telephone line (14) from which said telephone signals (140) are received, and having an output coupled to said control logic (38) by which said plurality of information output signals (32, 34, 36) are transmitted to said control logic (38);

a line status detector (24) having an input coupled to said telephone line (14) from which said telephone signals (140) are received, and having an output of a plurality of line status output signals (26, 28); said plurality of line status output signals (26,28) indicative of a presence of said calling party call termination ("Wink") signal (146) and said "Off Hook" condition voltage (26), and having a plurality of outputs coupled to said control logic (38) by which said plurality of line status output signals (26,28) are transmitted to said control logic (38);

an answering device status detector (20) coupled to said answering device (17); said answering device detector (20) having a plurality of answering device status output signals (48,50) indicative of said answering device (17) status and having an output coupled to said control logic (38) by which said plurality of answering device status output signals (48,50) are transmitted to said control logic (38);

a visual display (54) coupled to said control logic (38); and an audible device (46) coupled to said control logic (38);

said control logic (38) being responsive to said information output signals (32, 34, 36), said line status output signals (26, 28), and said answering device status output signals (48, 50), and producing therefrom processed data (76) from which is derived an output (VS_OUT) (80) and a plurality of control signals (40, 41, 42);

said control logic (38) distinguishing said calling party call termination ("Wink") signal, and responding to a presence of said "Wink" signal (146) by preventing disconnect of said answering device (17), immediately after said calling party hangs up;

said control logic (38) being programmed to relay said output (VS_OUT) (80) to said answering device (17) after said calling party hangs up but while said answering device (17) is prevented from disconnecting from said control logic (38);

said output (VS_OUT) (80) being announced on said audible device (46) and recorded on said answering device (17), under control of said plurality of control signals (40, 41, 42), for later playback; said processed data (76) also being displayed on said visual display (54).

5. The apparatus as claimed in claim 4 in which said answering device (17) is a telephone answering machine.

6. The apparatus as claimed in claim 4 in which said output (VS_OUT) (80) is a voice synthesized output.

7. The apparatus as claimed in claim 4 in which said control logic (38) further comprises:

an input circuit device (71);

a reference clock (72) having a reference signal;

a microcontroller (70) responsive to preprogrammed instructions and responsive to said reference signal provided by said reference clock (72);

a data bus (D) for carrying said processed data (76);

an address bus (A);

a bus transceiver (82) for moving said processed data (76) from said data bus (D) to and from said microcontroller (70);

a static random access memory device (SRAM) (84);

an erasable programmable read only memory device (EPROM) (86); and an output circuit device (78);

said bus transceiver (82), said SRAM (84), said EPROM (86), and said output circuit device (78) being coupled to said input circuit device (71) through said data bus (D);

said microcontroller (70) being coupled to said input circuit (71) through said bus transceiver (82) and said data bus (D) and receiving said decoded CID information therefrom, said microcontroller (70) being coupled to said SRAM (84) and said EPROM (86) through said address bus (A) and said data bus (D); said microcontroller (70) issuing switching control instructions (control 1,2), answering device circuit isolation instructions (control 0), fetching, processing, forwarding and storing said processed data (76) through said bus transceiver (82) in accordance with preprogrammed instructions stored in said EPROM (86).

8. An apparatus for processing telephone signals (140) carried on a telephone line (14); said telephone signals (140) including incoming messages (152), a frequency-shift-keying carrier signal, caller identification (CID) information (148) carried on said frequency-shift-keying carrier signal, a ring signal (150), a calling party call termination ("Wink") signal (146) and an "Off Hook" condition voltage (158), said apparatus comprising:

a control logic means (38) for processing information derived from said telephone signals (140) and producing a plurality of control signals (40,41,42) and processed data (76) for display, storage, and conversion into a voice synthesized output (VS_OUT) (80) for recording;

a caller identification (CID) decoder means (30) for decoding said caller ID information (148) carried on said frequency-shift-keying carrier signal and producing a plurality of information output signals (32, 34, 36) indicative of said CID information (148), said ring signal (150) and said frequency-shift-keying carrier signal, said CID decoder means (30) having an input coupled to said telephone line (14), from which said telephone signals (140) are received; said CID decoder means (30) having a plurality of outputs coupled to said control logic means (38) by which said plurality of output signals (32, 34, 36) are transmitted to said control logic means (38);

a line status detector means (24) for detecting said telephone signals (140) status and producing a plurality of line status output signals (26, 28) indicative of a presence of said calling party call termination ("Wink") signal (146) and said "Off Hook" condition voltage (158), said line status detector means (24) having an input coupled to said telephone line (14) from which said plurality of line status output signals (26, 28) are received; said line status detector means (24) having a plurality of outputs coupled to said control logic means (38) by which said plurality of line status output signals (26, 28) are transmitted to said control logic means (38);

an answering device means (17) for accepting and recording said incoming messages, said processed data (76) and said voice synthesized output (VS_OUT) (80); said answering device means (17) being coupled to said telephone line (14) and to said control logic means (38) through a switching device (18) controlled by said control logic means (30);

an answering device status detector means (20) for detecting a status of said answering device means (17) and producing a plurality of answering device status output signals (48, 50) indicating when said answering device means (17) is active and inactive and when said answering device (17) is transmitting a message; said answering device status detector means (20) having a plurality of outputs coupled to said control logic means (38) by which said plurality of answering device output signals (48, 50) are transmitted to said control logic means (38); said answering device status detector means (20) coupled to said answering device means (17);

a visual display means (54) for visually displaying said data signals (76); and an audible means (46) for announcing said data signals (76);

said control logic means (38) processing said information output signals (32, 34, 36), said line status output signals (26, 28), and said answering device status output signals (48, 50), and producing thereby said processed data (76) and said plurality of control signals (40, 41, 42); said processed data (76) being converted to voice synthesized output (VS_OUT) (80) and recorded on said answering device means (17) for later playback, under control of said control signals (40, 41, 42);

said control logic means (38) distinguishing said calling party call termination ("Wink") (146) signal and responding to a presence of said "Wink" signal by disconnecting said answering device means (17) from said telephone line 14 but maintaining said answering device (17) connected to said control logic (38), and relaying said voice synthesized output (VS_OUT) (80) to said answering device (17) after said calling party hangs up but while said answering device means (17) is maintained connected to said control logic (38);

said plurality of processed data (76) being displayed on said visual display means (54) and announced on said audible means (46).

9. An apparatus for processing calling party identification (CID) information contained in telephone signals (140) carried on a telephone line (14) from a calling party to a called party, said telephone signals (140) including incoming messages (152), caller identification (CID) information (148) carried on a frequency-shift-keying carrier, a ring signal (150), a calling party call termination ("Wink") signal (146) and an "Off Hook" condition voltage (158), said apparatus comprising:

an answering device (17);

a control logic means (38) for processing information derived from said telephone signals (140) and producing a plurality of control signals (40,41,42), and processed data (76) used for conversion into voice synthesized output (VS_OUT) (80) and recording, said control logic means (38) distinguishing said calling party call termination ("Wink") signal (146) and responding to a presence of said "Wink" signal (146) by isolating said answering device (17) from said telephone line (14) but maintaining said answering device (17) connected to said control logic (38) after said calling party hangs up;

a caller identification (CID) decoder means (30) for decoding caller ID information (148) from said frequency-shift-carrier signal and producing a plurality of information output signals (32,34,36) indicative of said caller identification (CID) information, said CID decoder means (30) having an input coupled to said telephone line (14), said CID decoder means (30) having an output coupled to said control logic means (38) by which said plurality of information output signals (32,34,36) are transmitted to said control logic means (38);

a line status detector means (24) for detecting said telephone signals (140) and producing a plurality of line status output signals (26,28) indicative of a presence of said calling party call termination ("Wink") signal (148) and said "Off Hook" condition voltage (158), said line status detector means (24) having an input coupled to said telephone line (14) from which said telephone signals (140) are received, said line status detector means (24) having a plurality of outputs coupled to said control logic means (38) by which said plurality of line status output signals (26,28) are transmitted to said control logic means (38);

a switching means (18) for controlling input and output connections to said answering device (17), said switching means (18) coupled to said control logic (38), to said answering device (17) and to said telephone line (14);

an answering device status detector means (20) coupled to said answering device (17), for detecting a status of said answering device (17) and producing a plurality of answering device status output signals (48,50) indicating when said answering device (17) is active and inactive and when said answering device (17) is transmitting a message; said answering device status detector means (20) having a plurality of outputs coupled to said control logic means (38) by which said plurality of answering device output signals (48,50) are transmitted to said control logic means (38);

a visual display means (54) for displaying said processed data (76);

an audible means (46) for verbally announcing said processed data (76);

a voice synthesizer means (58) for producing speech signals (VS_OUT) (80) for recording on said answering device (17), and for producing an audible message on said audible means (46); said audible message including said caller identification information (148); and user control means (52) coupled to said control logic means (38) for permitting said called party to select parameters for recording and display;

said control logic means (38) being coupled to said line status detector (24); said answering device status detector (20) and said CID decoder means (30) and receiving therefrom said plurality of line status output signals (26, 28); said plurality of answering device status output signals (48, 50) and said plurality of information output signals (32, 34, 36);

said control logic means (38) being coupled to said visual display means (54), said voice synthesizer means (58), said audible display means (46); said real time clock 56 and said switching means (18) to deliver said processed data (76) containing said CID information (148) for real time clock 56 update, for real time display and for recording for later playback;

said control logic means (38) responding to said information output signals (32,34,36), said line status signal outputs (26,28) and said answering device status output signals (48,50) by providing said processed data (76) and said plurality of control signals (40,41,42);

said control logic means (38) relaying said processed data (76) to said voice synthesizer 58, from which said voice synthesizer 58 creates said speech signals (VS_OUT) (80) which are sent to said audible means (46) and to said answering device (17) under control of said control signals (40,41,42).

10. A method for processing telephone signals (140) carried on a telephone line (14), said telephone signals (140) including incoming messages (152), caller identification (CID) information (148) carried on a frequency-shift-keying carrier signal, a calling party call termination ("Wink") signal (146), and an "Off Hook" condition voltage (158), comprising the steps of:

coupling a caller ID recorder (10) to a telephone (12), to an answering device (17) and to said telephone line (14);

receiving said telephone signals (140) on said caller ID recorder (10) and decoding said CID information (148);

detecting said "Wink" signal (146) and discriminating against other similar signals;

preventing said "Wink" signal (146) from reaching said answering device (17) by disconnecting said answering device (17) from said telephone line (14) and simultaneously applying a d.c. bias voltage for the duration of said "Wink" signal 146 to prevent said answering device (17) from hanging up;

generating a CID data recording signal (156) from said decoded CID information (148);

producing a visual display (54) and an audible announcement (46) of said decoded CID information (148);

recording said CID data recording signal (156) on said answering device (17) after said caller has hung up but before reconnecting said answering device (17) to said telephone line (14); and producing a substitute "Wink" signal and supplying said substitute "Wink" signal to said answering device (17), causing said answering device (17) to hang up and await a new call.

11. The method claimed in claim 10 in which said step of decoding said CID information (148) includes the step of decoding other information carried on said frequency-shift-keying carrier signal.

12. The method claimed in claim 10 in which said generating a CID data recording signal (156) includes the steps of > converting said decoded CID information (148) into processed data (76) in control logic (38);
>
> deriving a synthesized speech output (VS_OUT) (80) from said processed data (76) in a voice synthesizer (58); and
>
> coupling said synthesized speech output (VS_OUT) (80) to said answering device (17) for recording as said CID data recording signal (156).

13. A method for processing telephone signals (140) carried on a telephone line (14), said telephone signals (140) including a telephone carrier (144), a frequency-shift-keying carrier signal, caller identification (CID) information (148) carried on said frequency-shift-keying carrier signal, a ring signal (150), incoming messages (152) from a caller, a calling party call termination ("Wink") signal (146) and an "Off Hook" condition signal (158), comprising:

> providing a caller identification (CID) decoder (30), a line status detector (24), an answering device (17) an answering device status detector (20), a control logic (38), a switching device (18), a visual display (54), a real time clock 56, user controls (52), a speaker (46) and a speaker switch (44); said CID decoder (30) and said line status detector (24) coupled to said telephone line (14) and coupled to said control logic (38); said answering device status detector (20) coupled to said answering device (17) and to said control logic (38); said answering device (17) coupled to said control logic (38) through said switching device (18); said visual display (54), said real time clock (56), said speaker (46), said speaker switch and said user controls (52) coupled to said control logic (38);
>
> producing a plurality of information output signals (32, 34,36) indicative of said CID information (148), said frequency-shift-keying carrier signal and said ring signal (150), with said CID decoder (30), and transmitting said plurality of information output signals (32,34,36) to said control logic (38);
>
> detecting a status of said telephone signals (140) on said telephone line (14) and producing a plurality of line status output signals (26, 28) indicative of a presence of said calling party call termination ("Wink") signal (146) and said "Off Hook" condition voltage (158) with said line status detector (24) and transmitting said plurality of line status output signals (26, 28) to said control logic (38);
>
> detecting a status of said answering device (17) and producing a plurality of answering device status output signals (48, 50) indicative of said answering device (17) status with said answering device status detector (48), and transmitting said plurality of answering device status output signals (48, 50) to said control logic (38);
>
> processing said information output signals (32, 34, 36), said line status output signals (26, 28), and said answering device status output signals (48, 50) with said control logic (38) and producing by said processing, processed data (76) and a plurality of control signals (40, 41, 42);
>
> disconnecting said answering device (17) from said telephone line (14) when said "Wink" signal (146) is detected by said line status detector (24) and connecting said answering device (17) to said voice synthesizer (58) by applying one of said plurality of control signals (40, 41, 42) to said switching device (18), preventing said "Wink" signal (146) from reaching said answering device (17);
>
> relaying said processed data (76) to said voice synthesizer (58);
>
> converting said processed data (76) to speech signals (VS_OUT) (80);
>
> recording said speech signals (VS_OUT) (80) on said answering device (17) after said caller hangs up but while said answering device (17) is still connected to said voice synthesizer (58) under control of said control signals (40, 41, 42), for later display; and
>
> displaying said processed data (76) visually on said visual display (54) and announcing said speech signals (VS_OUT) (80) audibly on said speaker (46).

* * * * *